United States Patent
Beaumont et al.

(10) Patent No.: US 10,726,197 B2
(45) Date of Patent: Jul. 28, 2020

(54) TEXT CORRECTION USING A SECOND INPUT

(71) Applicant: Lenovo (Singapore) Pte. Ltd., Singapore (SG)

(72) Inventors: Suzanne Marion Beaumont, Wake Forest, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 375 days.

(21) Appl. No.: 14/669,720

(22) Filed: Mar. 26, 2015

(65) Prior Publication Data

US 2016/0283453 A1  Sep. 29, 2016

(51) Int. Cl.
| | |
|---|---|
| G06F 17/24 | (2006.01) |
| G06F 40/166 | (2020.01) |
| G06F 40/232 | (2020.01) |
| G10L 15/00 | (2013.01) |

(52) U.S. Cl.
CPC .......... *G06F 40/166* (2020.01); *G06F 40/232* (2020.01); *G10L 15/00* (2013.01)

(58) Field of Classification Search
CPC ........ G06F 17/24; G06F 3/167; G06F 17/273; G10L 15/00
See application file for complete search history.

(56) References Cited

U.S. PATENT DOCUMENTS

| | | | | |
|---|---|---|---|---|
| 5,937,380 A * | 8/1999 | Segan | ..................... | G10L 15/24 704/235 |
| 6,401,065 B1 * | 6/2002 | Kanevsky | ............. | G06F 3/0238 704/256.4 |
| 6,904,405 B2 * | 6/2005 | Suominen | ............... | G10L 15/22 704/235 |
| 7,058,888 B1 * | 6/2006 | Gjerstad | ................. | G06F 3/038 715/235 |
| 7,062,439 B2 * | 6/2006 | Brittan | .................. | G10L 13/027 704/220 |
| 7,319,957 B2 * | 1/2008 | Robinson | ............... | G06K 9/222 704/252 |
| 7,516,070 B2 * | 4/2009 | Kahn | .................... | G06F 40/194 704/235 |
| 7,546,529 B2 * | 6/2009 | Reynar | ................. | G06F 17/276 704/235 |
| 7,616,338 B2 * | 11/2009 | Vleurinck | ............... | B41J 3/4075 358/1.11 |
| 8,224,654 B1 * | 7/2012 | LeBeau | ................... | G10L 15/22 704/231 |
| 8,355,915 B2 * | 1/2013 | Rao | ........................ | G10L 15/24 704/243 |
| 8,677,377 B2 * | 3/2014 | Cheyer | .................. | G09B 21/00 719/310 |

(Continued)

*Primary Examiner* — Jung-Mu T Chuang
(74) *Attorney, Agent, or Firm* — Ference & Associates LLC

(57) ABSTRACT

One embodiment provides a method including receiving, at a key input device, an electronic text input; obtaining, using a processor, an additional input comprising audio and relating to the electronic text input; modifying, using a processor, the electronic text input based upon the additional input; and providing, on a display device, electronic text which has been modified. Other aspects are described and claimed.

20 Claims, 3 Drawing Sheets

(56) References Cited

U.S. PATENT DOCUMENTS

| | | | |
|---|---|---|---|
| 8,700,996 B2* | 4/2014 | Unbedacht | G06F 17/212 715/243 |
| 8,719,014 B2* | 5/2014 | Wagner | G06F 17/273 704/1 |
| 9,075,783 B2* | 7/2015 | Wagner | G06F 17/273 |
| 9,165,257 B2* | 10/2015 | Badger | G06F 3/0237 |
| 9,280,971 B2* | 3/2016 | McLean | H04M 1/72552 |
| 2002/0026320 A1* | 2/2002 | Kuromusha | G06F 3/0481 704/270 |
| 2003/0212961 A1* | 11/2003 | Soin | G06F 3/04883 715/271 |
| 2003/0233237 A1* | 12/2003 | Garside | G06F 3/038 704/270 |
| 2004/0034653 A1* | 2/2004 | Maynor | G06F 17/30017 |
| 2004/0049375 A1* | 3/2004 | Brittan | G10L 13/027 704/9 |
| 2005/0027532 A1* | 2/2005 | Okutani | G10L 13/04 704/260 |
| 2005/0209855 A1* | 9/2005 | Okutani | G09B 7/02 704/256.4 |
| 2005/0234722 A1* | 10/2005 | Robinson | G06K 9/222 704/257 |
| 2005/0283364 A1* | 12/2005 | Longe | G10L 15/24 704/257 |
| 2005/0288934 A1* | 12/2005 | Omi | G06F 3/038 704/270 |
| 2006/0155518 A1* | 7/2006 | Grabert | G06F 17/50 703/1 |
| 2006/0190249 A1* | 8/2006 | Kahn | G10L 15/26 704/235 |
| 2006/0274051 A1* | 12/2006 | Longe | G06F 3/0237 345/173 |
| 2008/0120102 A1* | 5/2008 | Rao | G10L 15/22 704/235 |
| 2008/0133228 A1* | 6/2008 | Rao | G10L 15/24 704/231 |
| 2008/0141125 A1* | 6/2008 | Ghassabian | G06F 40/274 715/261 |
| 2008/0195370 A1* | 8/2008 | Neubacher | G06F 17/241 704/1 |
| 2008/0228496 A1* | 9/2008 | Yu | G06F 3/038 704/275 |
| 2008/0288257 A1* | 11/2008 | Eide | G10L 13/10 704/260 |
| 2009/0018832 A1* | 1/2009 | Mukaigaito | G10L 15/1815 704/251 |
| 2009/0319266 A1* | 12/2009 | Brown | G06F 9/4443 704/235 |
| 2010/0009720 A1* | 1/2010 | Cha | G06F 1/1624 455/566 |
| 2010/0031143 A1* | 2/2010 | Rao | G06F 3/0237 715/261 |
| 2010/0223055 A1* | 9/2010 | McLean | H04M 1/72552 704/235 |
| 2010/0332217 A1* | 12/2010 | Wintner | G06F 40/30 704/9 |
| 2011/0010174 A1* | 1/2011 | Longe | G10L 15/24 704/235 |
| 2011/0201387 A1* | 8/2011 | Paek | G06N 20/00 455/566 |
| 2011/0202836 A1* | 8/2011 | Badger | G06F 3/0237 715/702 |
| 2011/0231291 A1* | 9/2011 | Yankovich | G06Q 30/02 705/27.1 |
| 2012/0078627 A1* | 3/2012 | Wagner | G06F 40/166 704/235 |
| 2012/0245946 A1* | 9/2012 | Anderl | G06F 16/27 704/275 |
| 2013/0033643 A1* | 2/2013 | Kim | G06F 3/017 348/563 |
| 2013/0035941 A1* | 2/2013 | Kim | G06F 3/017 704/275 |
| 2013/0046544 A1* | 2/2013 | Kay | G06F 3/04883 704/275 |
| 2013/0089307 A1* | 4/2013 | Kinoshita | H04N 5/76 386/297 |
| 2013/0227387 A1* | 8/2013 | Undebacht | G06F 17/212 715/227 |
| 2014/0100850 A1* | 4/2014 | Won | G06F 3/167 704/250 |
| 2014/0208209 A1* | 7/2014 | Na | G06F 3/167 715/728 |
| 2015/0187355 A1* | 7/2015 | Parkinson | G06F 3/017 704/235 |
| 2015/0193410 A1* | 7/2015 | Jin | G06F 17/24 715/256 |
| 2015/0317299 A1* | 11/2015 | Park | G06F 3/0233 704/275 |
| 2016/0103812 A1* | 4/2016 | Badger | G06F 3/0237 715/271 |
| 2016/0163316 A1* | 6/2016 | McLean | H04M 1/72552 704/235 |
| 2016/0259535 A1* | 9/2016 | Fleizach | G09B 21/006 |
| 2016/0283453 A1* | 9/2016 | Beaumont | G06F 17/24 |
| 2016/0379513 A1* | 12/2016 | DuQuette | G09B 13/00 434/227 |
| 2018/0166080 A1* | 6/2018 | Yu | G06F 17/24 |

\* cited by examiner

TEXT CORRECTION USING A SECOND INPUT

BACKGROUND

Information handling devices (e.g., cellular phones, tablet devices, smart phones, smart watches, laptop computers, personal computers, etc.) allow users to input electronic text, for example, through a soft keyboard, slide out keyboard, standard keyboard, and the like. Conventionally, upon entry of electronic text, some devices have programs which may attempt to correct the electronic text. For example, some programs will correct (or simply autocorrect) the electronic text if the program identifies inconsistencies, for example common misspellings or grammar errors. Typically, this modification consists of the program making a best guess about what the user intended to input. Other correction programs may, rather than correcting the electronic text, suggest alternative words for the user to choose.

BRIEF SUMMARY

In summary, one aspect provides a method, comprising: receiving, at a key input device, an electronic text input; obtaining, using a processor, an additional input comprising audio and relating to the electronic text input; modifying, using a processor, the electronic text input based upon the additional input; and providing, on a display device, electronic text which has been modified.

Another aspect provides an information handling device, comprising: an audio input device, a key input device; a display device; a processor operatively coupled to the audio input device, the key input device, and the display device; and a memory device that stores instructions executable by the processor to: receive, at the key input device, an electronic text input; obtain an additional input comprising audio and relating to the electronic text input; modify the electronic text input based upon the additional input; and provide, on the display device, electronic text which has been modified.

A further aspect provides a product, comprising: a storage device that stores code executable by a processor, the code comprising: code that receives an electronic text input; code that obtains an additional input comprising audio and relating to the electronic text input; code that modifies the electronic text input based upon the additional input; and code that provides electronic text which has been modified.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
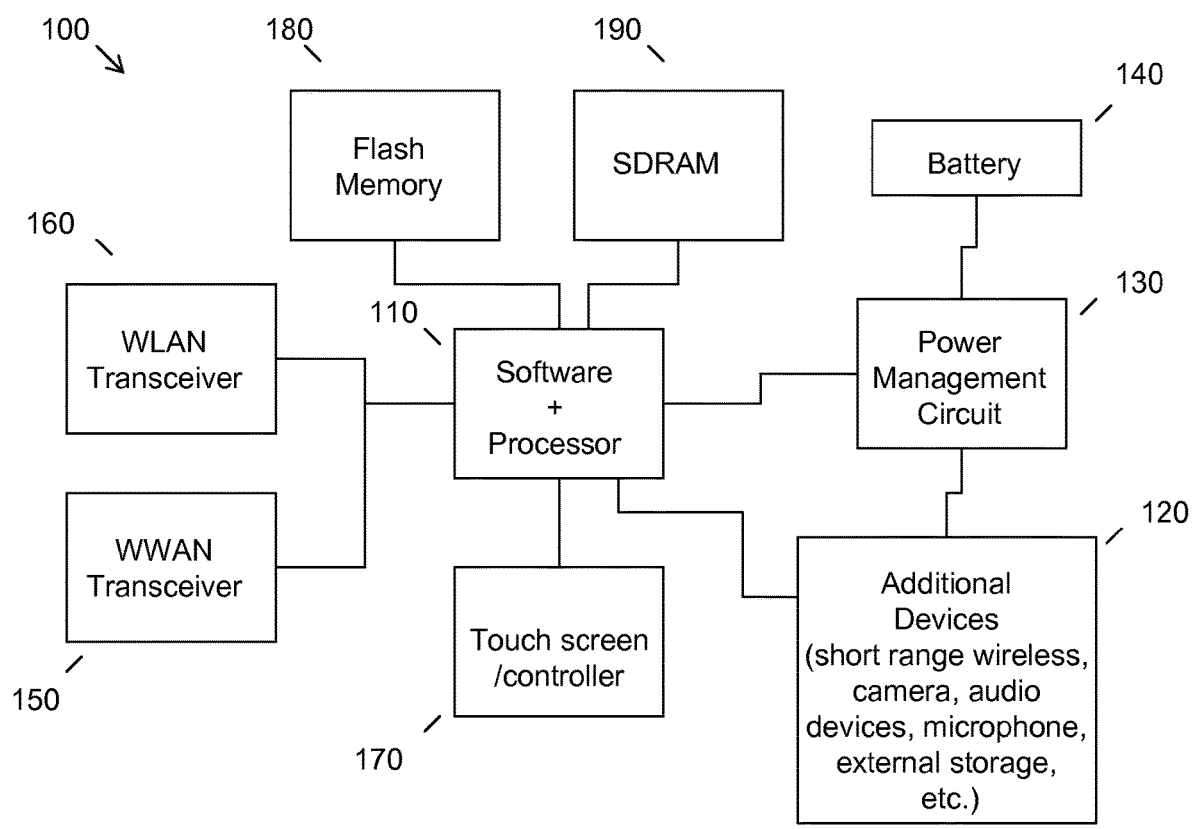
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Information handling devices (e.g., smart phones, cellular phones, tablets, personal computers, laptop computers, etc.) allow a user to input electronic text. For example, a user may input text for a word processing application, an email application, a text messaging application, and the like. In some cases, the text input may be errant. For example, a user may type a word incorrectly or a word may be misspelled. Many of these information handling devices ("devices") employ autocorrect programs to assist in resolving inconsistencies. For example, some autocorrect programs may determine that a word has been misspelled and may then modify the electronic text to match the correct spelling of a word. In some cases, a word may be misspelled with no clear indication of the intended word. The autocorrect program may then make a best guess on the intended word and change the word to this best guess. In some cases, this best guess is incorrect and results in, at best, humorous and, at worst, egregious misrepresentations of the user's intended meaning.

One problem with these autocorrect programs is that the program may be unable to tell when a person intended to type one thing and ended up typing a different, but correctly spelled word. Additionally, these programs may be unable to discern the correct spelling of certain words, for example, proper names. Alternatively, a person may enter a word which the program may determine is incorrectly spelled but the program may either have no suggestion for a correction or may correct the word incorrectly. This may be especially true when a user is inputting a proper name. Another issue with conventional autocorrect programs is that some of these autocorrect programs may change correctly spelled words into other correctly words without regard for the sentence context. For example, a person may be attempting to type "I love my mom" but the program instead changes "love" to "live" and results in "I live my mom". The words are spelled correctly, however the result is incorrect. This system leads to many of the "autocorrect fails" that people experience.

Another correction technique that is employed is a system which presents alternatives for the user to choose from. For example, the program may notice that a person has misspelled a word and may present three alternatives for the person to choose from. This requires that the user stop typing or providing text input and select the correct word from the list presented. Additionally, if the word that the user desires is not presented in the list the user has to perform additional actions to get the correct word.

These and other conventional approaches to autocorrecting electronic text input by a user regularly result in frustration and embarrassment for a user. The current methods for performing autocorrection or word suggestion frequently result in incorrectly modified electronic text input or unhelpful word suggestions. As such, a technical problem is found in that current autocorrect methods fail to take advantage of secondary input that may be received at the time that the electronic input is provided or at a time frame before or after the electronic text input has been provided, e.g., within a predetermined time frame or window.

Accordingly, an embodiment provides a method of receiving electronic text input from a user at an information handling device's input device and using an additional or second input to modify the electronic text input. For example, in one embodiment a user may provide audio input which may be used as the second input. In one embodiment, the second input may be obtained at the same time that the electronic text input is received. For example, a user may be speaking and providing text input at the same time. In an embodiment, the second input may be received after the electronic text has been accepted. For example, a user may notice that the electronic text output on the display is not as they intended so they may provide audio input to correct the text. If an embodiment determines that the second input is different than the electronic text input, the embodiment may modify the electronic text input to match the second input. If the second input comprises a plurality of words, an embodiment may filter the words to determine which word the user intended to provide as a modification for the electronic text input. One embodiment may use, in addition to the second input, context data to assist in making a modification to the electronic text input. For example, the context data may include a user's contacts, which for example may provide additional data to make a determination regarding a proper name that the user has entered. Once the electronic text input has been modified, an embodiment may provide this to the user on a display device.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., a microphone that operates with a speech processing system for providing additional input data, as further described herein. System 100 often includes a touch screen 170 for data input and display/rendering. System 100 also typically includes various memory devices, for example flash memory 180 and SDRAM 190.

Figure 2:
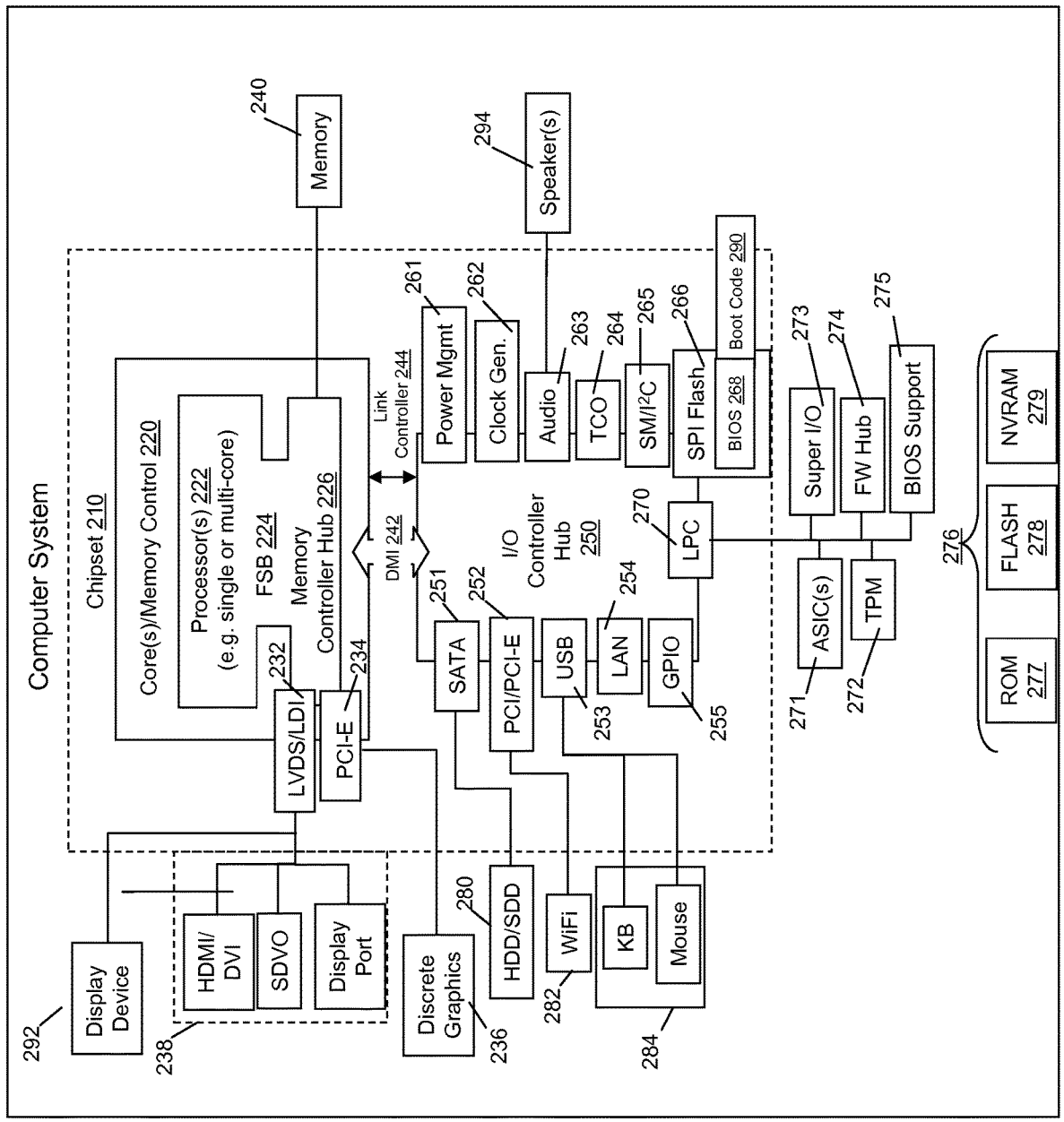
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices to which users may provide input or may be devices which employ autocorrect programs. For example, the circuitry outlined in FIG. 1 may be implemented in a tablet or smart phone embodiment, whereas the circuitry outlined in FIG. 2 may be implemented in a personal computer embodiment.

Figure 3:
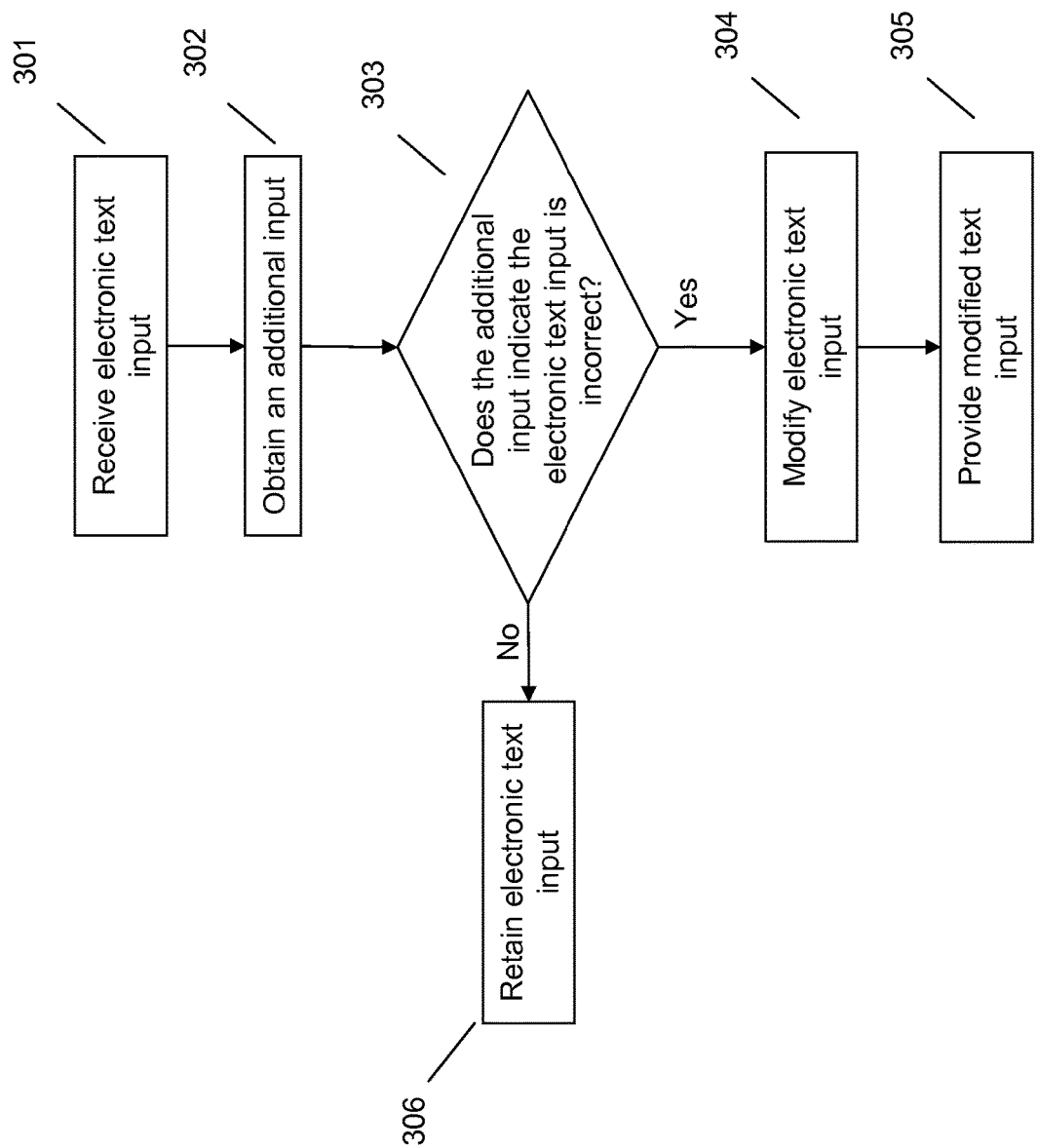
FIG. 3 illustrates an example method of text correction using a second input.

Referring now to FIG. 3, an embodiment may receive, at an input device (e.g., touch screen, soft keyboard, standard keyboard, slide out keyboard, etc.) an electronic text input ("text input"). For example, a user may provide input into a word processing application, text messaging application, email application, and the like. At 302, an embodiment may obtain an additional or second input (e.g., audio data, gesture input, context data, etc.) relating to the electronic text input. Although described as a second input, this additional input may be received before, during or after the electronic text input. Moreover, the additional input may be retrieved or obtained, e.g., in the case of contextual data such as contact data, sentence structure data, etc. Thus, in one embodiment this second input may be obtained while the electronic text input is received. For example, as a user is providing the text input, the user may additionally be speaking the words that correspond to or are associated with that text input.

In an alternative or additional embodiment the second input may be received after the electronic text input. For example, an embodiment may receive, accept, and display the electronic text input. The acceptance of the electronic text input may additionally include the device employing conventional autocorrect techniques which may modify the text. The user may then notice that the word provided is not what they intended. A user may then provide a second input to indicate a correction is required. For example, a user may make a particular gesture or provide a particular phrase (e.g., "no phone," "that is wrong," etc.) to indicate to the device that the word needs to be corrected.

A user may be able to provide just the corrected word and an embodiment may use the corrected word to determine which word is incorrect and change it based upon the provided input. For example, if a user has typed "I cano go." The user may then notice that they did not mean "cano" and say or voice the word "cannot." An embodiment may determine that the user intends the sentence to read "I cannot go" by associating the voiced word "cannot" in time with the electronic text entry "cano" and further using a rule, e.g., "cannot" is appropriate for inclusion in the sentence in place of "cano." Therefore, an embodiment may change "cano" to "cannot" in an automated or semi-automated fashion for the user In an embodiment this determination and correction processing may be made using context clues. For example, an embodiment may determine that the only misspelled word in the phrase is "cano," so an embodiment may correct the misspelled word using the second input. As another example, an embodiment may determine that the provided audio input is most closely similar to "cano" and may then determine that the user intends to correct this word. These methods are intended only as examples other methods of determining the word or phrase to modify are contemplated.

In one embodiment, a user may provide a phrase as corrective input. For example, if an embodiment determines that a whole group of electronic text input words appears to be inconsistent with the phrase, the embodiment may modify the entire group of electronic text input words using a voiced phrase of words. As another example, the phrase of corrective word input that a user voices may be filtered and only one or two words used to modify the text input. By way of specific example, a user may type "pick up molk." The user may then say "no phone, I meant milk." An embodiment may determine that the phrase "no phone, I meant" is superfluous and ignore this part of the phrase. The embodiment may then use the word "milk" as input to correct the text.

Again, voice processing may be utilized by an embodiment to associate the corrective input with the text entry input, e.g., to associate the voiced word "milk" with the text entry of "molk" based on character similarity. Additional sources of data may be used as well. For example, an embodiment may prioritize or rank candidate corrective words based on voice processing and character similarity, and then refine this prioritization using context data. By way of specific, non-limiting example, an embodiment may initially prioritize the voiced word "milk" as being a candidate to correct the misspelled "molk," with this initial determination being firmed up or given greater weight by use of contextual data. An example of contextual data in this situation may be the fact that surrounding words indicate that this is a grocery list, and "milk" is logically included in this topic along with other words, e.g., other items found at a grocery store.

At 303, an embodiment may determine whether the second or additional input indicates that the electronic text input was incorrectly received or accepted. In other words, an embodiment may determine whether the second input indicates that the text input currently displayed is correct. For example, an embodiment may determine that the user has provided a particular gesture, for example, a hand swipe, erasure motion, finger movement, or other gesture which has been programmed to indicate an incorrect input, which indicates the text input is incorrect. While, in some embodiments, the user may have to provide a particular gesture or phrase to indicate to the device that the text input is incorrect, in other embodiments, the user may just provide the correcting input as discussed above.

If, at 303, it is determined that the electronic text input was correctly received, an embodiment may retain the electronic text input at 306 and display the received electronic text input. If, however, at 303 it is determined that the electronic text input was incorrectly received, an embodiment may modify the electronic text input at 304 based upon the second input. In one embodiment, if the second input is provided at approximately the same time as the text input (e.g., the user is speaking and typing at the same time) the modifying may occur while the text input is received. For example, in one embodiment the text input received may not be displayed on the display device but rather may be modified first. As another example, the text input may be displayed but modified shortly after being displayed.

If, however, the second input is provided at a time later then the text input (e.g., the user notices the displayed text input is incorrect and then provides a second input) the modification may occur in response to the obtaining of the second input. A combination of these methods may be used. Additionally, a user may provide a second input at approximately the same time as the text input which may cause a modification to the text and additionally provide an additional input at a later time to modify the same word. For example, if a user is speaking and typing at the same time the text input may be modified to match what the device has interpreted as the audio data. The user may then notice that the text was incorrectly modified and provide additional audio data to correct the text input for a second time.

In order to assist with the modification, an embodiment may use additional data to assist in determining the user's intended input. In one embodiment, the additional data may be conventional autocorrect input (e.g., spell check, grammar check, etc.). In one embodiment, this additional data may include context data relating to the electronic text input. For example, if an embodiment detects a discrepancy between the text input and the second input, an embodiment may use additional data to resolve the discrepancy. As another example, if an embodiment cannot discern the second input (e.g., the user's audio input is unclear), the embodiment may use additional data to assist in determining what the user intended. As a further example, an embodiment may use additional data if an embodiment determines too many alternatives for modifying the input.

The additional data may be obtained from a variety of sources. For example, context data may include previous communications or documents (e.g., previous emails, previous text messages, previous word processing documents, previously entered electronic text words, etc.). Alternatively or additionally, context data may include data gathered from the user's contact list. For example, if a user is inputting a proper name, an embodiment may use the user's contact list to determine the correct spelling of the proper name. The additional data may be stored locally on the device, or may be alternatively or additionally stored in a location remotely connected to the device (e.g., cloud storage, remote storage device, etc.). Other types of additional data are contemplated. For example, an embodiment may use calendar events, context of the current composition, user history, application type, and the like, as context data. Once the additional data has been obtained, an embodiment may use this data to modify the electronic text input.

At 305, an embodiment may provide on a display device (e.g., monitor, touch screen, etc.) the modified electronic text. In other words, an embodiment may provide the electronic text that has been corrected based upon the second input and/or additional data that was obtained. In one embodiment the modified electronic text may be modified and inserted without the need for additional user input. One embodiment may additionally provide a visual indicator indicating that the electronic text has been modified. For example, an embodiment may provide, for example, a circle around the modified text, colored lines under the modified text, arrows pointing to the modified text, or the like.

In one embodiment this modified electronic text may be presented as a preview. For example, rather than modifying and inserting the text input, an embodiment may display the modified text allowing a user to accept or decline the modification. Alternatively, the modified text may be presented as a preview and if the user takes no action it may be inserted or the modified text may be inserted with no user input for a predetermined length of time.

The various embodiments described herein thus represent a technical improvement to current autocorrect techniques and systems. Using the techniques described herein, a user can provide a second input, for example, audio data, to a device which may be then used to modify the electronic text input provided by the user. This helps prevent the humorous, egregious, or incoherent text input offered by conventional autocorrect methods. Additionally, a user does not have to stop composition to select a presented alternative word or provide correction to an incorrectly modified word.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving, at a key input device, an electronic text input, wherein the electronic text input comprises a correctly spelled word;
    obtaining, responsive to accepting and displaying the electronic text input and using a processor, an additional input within a predetermined time frame of receipt of the electronic text input, the additional input comprising audio input relating to the electronic text input, wherein the audio input comprises an indication that a modification is to be made to the correctly spelled word within the electronic text input and comprises at least one corrected word, wherein the indication comprises a correction phrase comprising at least one word other than the at least one corrected word;
    identifying, based upon the identification, the correctly spelled word is to be modified, wherein the identifying comprises identifying a contextual association between the audio input and the electronic text input that indicates the correctly spelled word is to be modified, wherein the identifying the correctly spelled word is identified based upon the corrected word included in the audio input, wherein a word selected as the corrected word is selected by a weighting of a plurality of candidate words, the weighting based upon the contextual association;
    thereafter modifying the correctly spelled word utilizing the additional input, wherein the modifying comprises filtering the correction phrase from the audio input and utilizing the corrected word to correct the electronic text input; and
    providing, on a display device, electronic text which has been modified and a visual indication that the electronic text has been modified.

2. The method of claim 1, wherein the electronic text input comprises an input from a mechanical keyboard.

3. The method of claim 1, wherein the electronic text input comprises an input from a touch screen.

4. The method of claim 1, wherein the modifying the electronic text input occurs while the electronic text input is received.

5. The method of claim 1, wherein the modifying the electronic text input occurs in response to the obtaining an additional input.

6. The method of claim 1, further comprising obtaining context data relating to the electronic text input and wherein the modifying is additionally based upon the context data.

7. The method of claim 1, wherein the additional input comprises a plurality of words.

8. The method of claim 7, further comprising selecting at least one word from the plurality of words to use in modifying the electronic text input.

9. The method of claim 1, wherein the providing further comprises providing a visual indication indicating the electronic text input has been modified.

10. The method of claim 1, wherein the providing comprises providing a preview of the electronic text output.

11. An information handling device, comprising:
    an audio input device;
    a key input device;
    a display device;
    a processor operatively coupled to the audio input device, the key input device, and the display device; and
    a memory device that stores instructions executable by the processor to:
    receive, at the key input device, an electronic text input, wherein the electronic text input comprises a correctly spelled word;
    obtain, responsive to accepting and displaying the electronic text input, an additional input within a predetermined time frame of receipt of the electronic text input, the additional input comprising audio input relating to the electronic text input, wherein the audio input comprises an indication that a modification is to be made to the correctly spelled word within the electronic text input and comprises at least one corrected word, wherein the indication comprises a correction phrase comprising at least one word other than the at least one corrected word;
    identify, based upon the identification, the correctly spelled word is to be modified, wherein the identifying comprises identifying a contextual association between the audio input and the electronic text input that indicates the correctly spelled word is to be modified, wherein to identify the correctly spelled word is identified based upon the corrected word included in the audio input, wherein a word selected as the corrected word is selected by a weighting of a plurality of candidate words, the weighting based upon the contextual association;
    thereafter modify the correctly spelled word utilizing the additional input, wherein the modifying comprises filtering the correction phrase from the audio input and utilizing the corrected word to correct the electronic text input; and
    provide, on the display device, electronic text which has been modified and a visual indication that the electronic text has been modified.

12. The information handling device of claim 11, wherein the key input device comprises a mechanical keyboard.

13. The information handling device of claim 11, wherein the key input device comprises a touch screen.

14. The information handling device of claim 11, wherein to modify the electronic text input occurs while the electronic text input is received.

15. The information handling device of claim 11, wherein to modify the electronic text input occurs in response to the obtaining an additional input.

16. The information handling device of claim 11, wherein the instructions are further executable by the processor to obtain context data relating to the electronic text input and wherein to modify is additionally based upon the context data.

17. The information handling device of claim 11, wherein the additional input comprises a plurality of words and wherein the instructions are further executable by the processor to select at least one word from the plurality of words to use to modify the electronic text input.

18. The information handling device of claim 11, wherein to provide further comprises providing a visual indication indicating the electronic text input has been modified.

19. The information handling device of claim 11, wherein to provide comprises providing a preview of the electronic text output.

20. A product, comprising:
a storage device that stores code executable by a processor, the code comprising:
code that receives an electronic text input, wherein the electronic text input comprises a correctly spelled word;
code that obtains, responsive to accepting and displaying the electronic text input, an additional input within a predetermined time frame of receipt of the electronic text input, the additional input comprising audio input relating to the electronic text input, wherein the audio input comprises an indication that a modification is to be made to the correctly spelled word within the electronic text input and comprises at least one corrected word, wherein the indication comprises a correction phrase comprising at least one word other than the at least one corrected word;
code that identifies, based upon the identification, the correctly spelled word is to be modified, wherein the identifying comprises identifying a contextual association between the audio input and the electronic text input that indicates the correctly spelled word is to be modified, wherein the code that identifies the correctly spelled word is identified based upon the corrected word included in the audio input, wherein a word selected as the corrected word is selected by a weighting of a plurality of candidate words, the weighting based upon the contextual association;
code that, thereafter, modifies the correctly spelled word utilizing the additional input, wherein the modifying comprises filtering the correction phrase from the audio input and utilizing the corrected word to correct the electronic text input; and
code that provides electronic text which has been modified and a visual indication that the electronic text has been modified.

* * * * *